July 29, 1969     C. W. WOODSON     3,458,129
FLUIDIC FREQUENCY-TO-ANALOG CIRCUIT
Filed Nov. 29, 1967
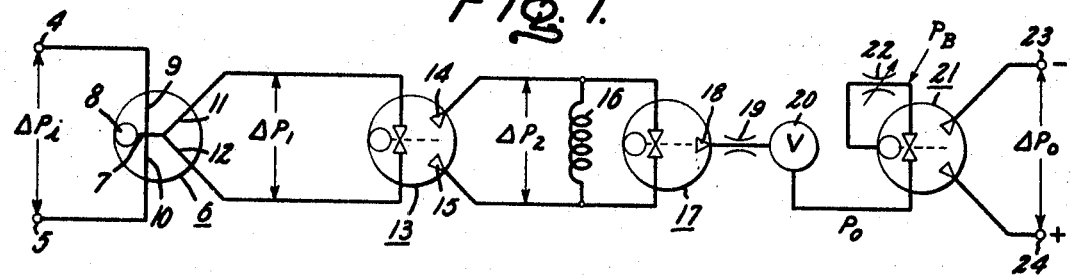
Fig. 1.
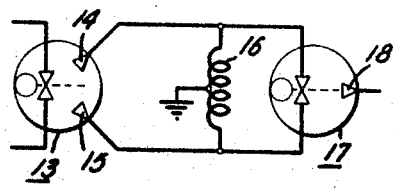
Fig. 2.
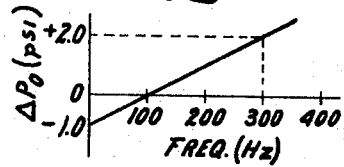
Fig. 3b.
Fig. 3a.
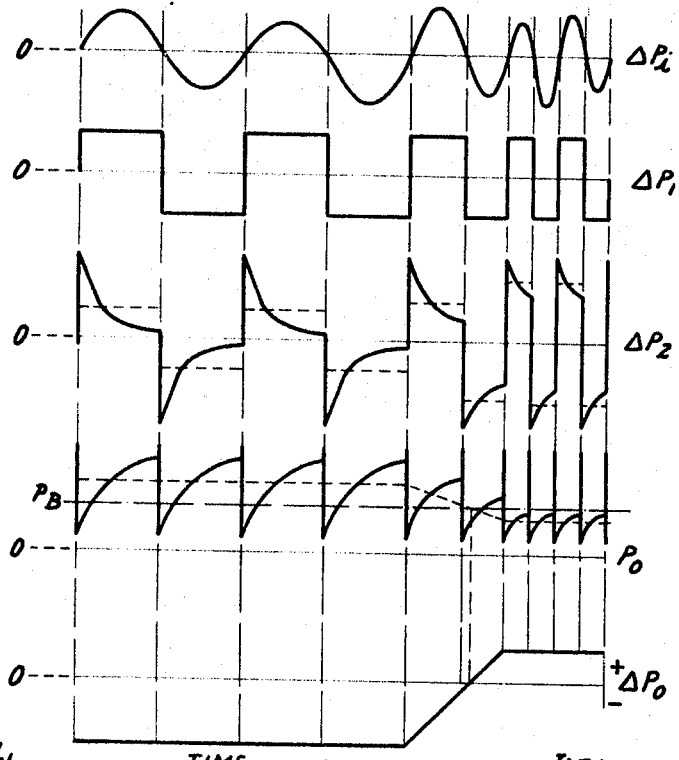
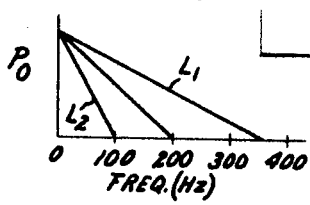
Fig. 3c.
Inventor:
Carl W. Woodson,
by Louis A. Moncha United States Patent Office 3,458,129
Patented July 29, 1969

3,458,129
FLUIDIC FREQUENCY-TO-ANALOG CIRCUIT
Carl W. Woodson, Scotia, N.Y., assignor to General
Electric Company, a corporation of New York
Filed Nov. 29, 1967, Ser. No. 686,602
Int. Cl. F15c 1/00, 4/00; G06d 5/00; G11c 25/00
U.S. Cl. 235—200         14 Claims

ABSTRACT OF THE DISCLOSURE

A no-moving mechanical parts fluidic circuit, for converting pressurized fluid signals having a particular frequency into a pressurized fluid analog signal having a pressure level inversely proportional to the frequency of the input signal, provides a linear and simple frequency indicating circuit useful in control systems. A digital-type fluid amplifier converts the input signals into constant amplitude, square wave pulses. Frequency-sensitive fluidic means in fluid communication with the output of the digital fluid amplifier reduces the average amplitude of the signals at low frequencies and has negligible effect at higher frequencies. A single-receiver analog-type fluid amplifier has its control fluid inlets in fluid communication with the frequency-sensitive means to provide at the output thereof an analog fluid signal having a pressure level inversely proportional to the frequency of the circuit input signal.

My invention relates to frequency indicating fluid amplifier circuits, and in particular, to circuits that perform the function of converting a pressurized fluid frequency (A.C.) input signal to an analog (D.C.) signal having a pressure level inversely proportional to the frequency of the input signal.

Fluid amplifiers are currently finding wide application in various fluid control systems as digital and analog computing elements. In a particular fluid control system such as a speed control system wherein motion of a movable member such as the rotational speed of a shaft is to be controlled, there is need for a circuit which converts pressurized fluid frequency signals, generated by a suitable transducer coupled to the movable member, into an analog type signal having a pressure level which is some known function of frequency.

Fluidic frequency-to-analog circuits are known but all of these prior art circuits either do not provide a very linear pressure output versus frequency characteristic or are relatively complex in structure.

Therefore, one of the principal objects of my invention is to provide a fluid amplifier circuit having no moving mechanical parts for converting a frequency signal to an analog signal having a very linear pressure output versus frequency characteristic.

Another object of my invention is to construct the fluidic circuit from a relatively few number of elements for ease of fabrication and to obtain a compact circuit device.

Briefly stated, my invention is a fluidic circuit comprising a digital-type fluid amplifier for producing constant amplitude, square wave, pressurized fluid pulses in response to an input frequency signal and a frequency-sensitive fluidic means for converting the square wave pulses into fluid signals having average pressure amplitudes being a function of the frequency of the input signal. The frequency-sensitive means has the characteristic of reducing the average amplitude of the signal at the output of the digital amplifier at low frequencies of the circuit input signal and having negligible effect at higher frequencies thereof. A third fluidic means responsive to the average amplitude signals produces an output analog signal having a pressure level inversely proportional to the frequency of the circuit input signal.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawing wherein like parts in each of the several figures are identified by the same reference character, and wherein:

FIGURE 1 is a schematic representation of a fluidic frequency-to-analog circuit constructed in accordance with my invention;

FIGURE 2 is a schematic representation of a modification of the frequency-sensitive portion of the circuit in FIGURE 1;

FIGURE 3a illustrates a series of pressurized fluid wave forms existing at various points of the circuit illustrated in FIGURE 1;

FIGURE 3b is a graphical representation of the linear output pressure versus input signal frequency characteristics of my circuit; and FIGURE 3c is a graphical representation of the effect of the frequency-sensitive portion of my circuit on the sensitivity and frequency range thereof.

Referring now in particular to FIGURE 1, there is shown a schematic diagram of a fluidic frequency-to-analog circuit constructed in accordance with my invention. The schematic symbols are in accordance with those established in U.S. Patent No. 3,232,533 to W. A. Boothe, entitled, "Fluid-Operated Logic Circuit," and assigned to the same assignee as the present invention. An alternating pressurized fluid input signal $\Delta P_i$ is supplied to the input terminals 4 and 5 of my circuit. The input signal in the most general case is provided from the output of a transducer which senses a particular control system variable or parameter such as shaft rotation and generates an alternating (A.C.) pressurized fluid signal having a waveform of the type illustrated in FIGURE 3a and indicated as $\Delta P_i$ therein. It is to be understood that this input signal may be variable in both amplitude and frequency, the frequency being directly proportional to the particular variable being sensed by the transducer. Suitable enclosed fluid flow passages transmit the input signal $\Delta P_i$ from the input terminals 4, 5 to the control fluid inlets of a digital-type fluid amplifier device 6. Digital-type fluid amplifiers are now well known and a detailed description of their structure will not be provided herein, attention being directed to the above-referenced U.S. Patent No. 3,232,533, for details of the structure and operation of this particular fluid-controlled device having no moving mechanical parts. With reference to such patent, and in particular the description relating to FIGURE 3 therein, digital device 6 is a bistable element comprising a power fluid inlet 7 terminating in a nozzle for forming a constant flowing jet of the power fluid. Device 6 is of the active type in that the power fluid inlet is connected to a source 8 of constant pressurized fluid to thereby provide a constantly flowing power jet. In my invention each of the fluid amplifiers in the circuit are of the active type. However, it is to be understood that the pressure level of the power fluid supply for each of the fluid amplifiers in my circuit is, in general, not equal.

Control fluid inlets 9 and 10 of device 6 terminate in nozzles for forming control fluid jets directed against opposite sides of the power jet. The control jets deflect the power jet within an interaction chamber defined by a pair of oppositely disposed and diverging side walls which obtain boundary layer action to confine the power fluid flow substantially exclusively to a corresponding one of two fluid receivers 11 and 12 positioned downstream of the power fluid inlet. The particular receiver obtaining the exclusive flow of power fluid is determined by the differential pressure of the control fluids supplied to control fluid inlets 9 and 10. In the most general case, the input siganl is a differentially pressurized signal $\Delta P_i$ although it may be single-sided ($P_i$) in some applications in which later case a small bias pressure would appropriately be supplied to the non-input signal control fluid inlet. For purposes of illustration only, input signal $\Delta P_1$ is indicated in FIGURE 3a as having a pressure versus time wave form similar to a sine wave but having variable peak amplitudes and variable frequency. The output of digital fluid amplifier 6 is a differentially pressurized fluid signal $\Delta P_1$ and is an alternating, constant amplitude, square wave pulse train having the same frequency as the input signal $\Delta P_1$ or $P_i$. The function of device 6 is that of a decoupler to couple the output of a transducer to a second fluid amplifier device 13, and also functions as a limiter to provide a signal having a pressure amplitude independent of the input signal amplitude or wave form, provided that the input signal level is sufficient to switch the bistable amplifier 6 from one of its stable modes of operation to the other.

The output $\Delta P_1$ of device 6 is the input signal supplied to the control fluid inlets of a second fluid amplifier device 13 comprising an analog-type fluid amplifier also described in detail in the above-cited Patent No. 3,232,533 and in particular with reference to the description of FIGURE 1 therein. The analog- or momentum-exchange type device 13 also includes a power fluid inlet and two receivers as in the case of device 6, however, the power fluid received (pressure recovery) in the receivers being determined by the degree of deflection of the power jet caused by the net momentum of the two opposed control jets. In the absence of an input signal $\Delta P_1$, the power jet would be directed midway between the two receivers 14 and 15, and in the presence of signal $\Delta P_1$, a proportionally greater amount of the power fluid is received (pressure recovered) in one receiver than in the other, the particular proportion being determined by the magnitude of the differential input signal $\Delta P_1$. For the particular case of an alternating, constant amplitude, square wave input signal $\Delta P_1$ applied to device 13, the output $\Delta P_2$ would also be of the same square wave form in the absence of any frequency-sensitive element or network in the output circuit. However, a passive frequency-sensitive element comprising a fluidic inductor 16 is connected across the fluid flow passages interconnecting the receivers of analog fluid amplifier 13 and the control fluid inlets of a single-receiver analog-type fluid amplifier device 17. The function of analog amplifier 13 is thus to act as a buffer or matching stage between the output of bistable digital amplifier 6 and the input to single-receiver analog amplifier 17.

The frequency-sensitive fluidic inductor 16 is a long, enclosed fluid flow passage of small cross-sectional area as one example comprises a relatively long length of thin tubing for imparting a greater inertia to any fluid flow therethrough and thereby obtain an inductive (derivative) or delay response to changes in fluid flow. The (increased inertia to fluid flow) effect produced by inductor 16 is indicated by the wave form of signal $\Delta P_2$ wherein the leading edge (having high frequency components) of each square wave pulse of signal $\Delta P_1$ is reproduced faithfully due to a high inertia effect while the constant amplitude portion of pulse $\Delta P_1$ (a substantially zero frequency component) is effectively shorted out by the inductor (the inertia effect is zero at zero frequency) as indicated by the decaying portion of wave form $\Delta P_2$. Thus, at low frequencies of the input signal $\Delta P_1$ and $\Delta P_1$ (in the range of approximately 0–150 Hz.) inductor 16 provides an inductive shorting circuit across the control fluid inlets of amplifier 17. This pronounced inductive effect on signal $\Delta P_2$ is indicated by the greater decay and resultant much reduced average amplitude (indicated by dashed lines passing through each pulse) of the first four pulses of signal $\Delta P_2$. At increasing frequencies (above approximately 150 Hz.) of the input signal, the effect of inductor 16 decreases in terms of shorting the differential input signal $\Delta P_2$ and has negligible effect at frequencies above approximately 300 Hz. This much less pronounced inductive effect is indicated by the much smaller decay and resultant only slightly reduced average amplitude of the last four pulses of signal $\Delta P_2$. The above frequencies are typical for an inductor having a particular inductance value L wherein L is directly proportional to the length of the tubing and inversely proportional to the inner diameter (squared) or cross-sectional area. The effective (inductive shorting effect) frequency range increases with decreasing inductance values and decreases with increasing inductance.

A second embodiment of my frequency-sensitive circuit is illustrated in FIGURE 2 wherein inductor 16 now comprises two long lengths of thin tubing having first ends connected to the fluid passages interconnecting the receivers of amplifier 13 and the control fluid inlets of rectifier 17, and having second ends vented to the atmosphere (indicated by the center-tap connection to ground). By being frequency-sensitive, as stated hereinabove, the inductive effect of the open-ended lengths of tubing 16 generate pressures dependent on the rate of change of control pressure $\Delta P_1$ supplied to analog amplifier 13. It is well known that anolog-type fluid amplifiers introduce undesirable phase lags in the fluid signals transmitted therethrough at the higher frequencies of operation since the frequency response for such amplifier may be approximated as $$\frac{K}{1+TS}$$

where K represents a frequency-sensitive amplifier gain, T a small time constant or delay in the control signal passing through the amplifier, and S is the Laplace operator. The complete frequency response for the amplifier thus can be represented in conventional Bode diagram form by a gain attenuation curve for gain G and a phase change curve wherein both curves are plotted versus the frequency of the control input signal, and the phase change curve is determined by the time constant T in accordance with conventional servomechanism or control system theory. In like manner, the complete frequency response for the tubing network 16 can be represented by a gain-sensitive (gain attenuation) versus frequency curve (as depicted in FIGURE 3c) and a phase-sensitive (phase change) versus frequency curve. Thus, the frequency-sensitiveness of my open-ended tubing network 16 inherently includes both gain-sensitiveness and phase-sensitiveness such that the signal $\Delta P_2$ undergoes phase changes in being transmitted from the receivers of amplifier 13 to the control inlets of rectifier 17 and the lengths of the open-ended tubing 16 determine the phase change of pressurized fluid signals transmitted therebetween.

Fluid amplifier 17 is of the analog type and has a single receiver 18 aligned with the power nozzle such that in the absence of a control fluid signal or in the presence of a balanced pressure differential signal $\Delta P_2$, the power jet is directed along the centerline axis of receiver 18 for maximum pressure recovery in the receiver. In the case of unbalanced signal $\Delta P_2$, a lesser pressure is recovered in receiver 18 and thus a single-sided output signal $P_o$ is obtained at the output of the receiver 18 in response to differentially pressurized alternating signal $\Delta P_2$. Device 17 is commonly referred to as a fluidic (full wave) rectifier since it produces a single polarity output for a double polarity input. Device 17 is thus an amplitude-sensitive rectifier in that the average amplitude of the single-sided output signal $P_o$ is inversely proportional to the average amplitude of each pulse of alternating input signals $\Delta P_2$. At low frequencies of $\Delta P_1$, the pulses $\Delta P_2$ are widely spaced and occupy small fractions of the period of each cycle, resulting in a large D.C. component in output $P_o$, With increasing frequency of $\Delta P_i$, the pulses $\Delta P_2$ occupy a greater percentage of the cycle time, resulting in a decrease in the D.C. component in $P_o$. The unfiltered output of rectifier 17 is indicated by the solid line representation $P_o$ in FIGURE 3a wherein the time pressure average (D.C. component) is seen to vary inversely with respect to frequency of the input signal $P_i$ (and signals $\Delta P_1$, and $\Delta P_2$).

The single-sided unfiltered signal $P_o$ at the output of rectifier 17 has a significant amount of ripple content superimposed on the D.C. component and for many applications these transient variations are undesirable. A passive fluidic resistor 19-capacitor 20 filter network is utilized to remove substantially all of such ripple content. The fluidic resistor 19 is a long, enclosed fluid flow passage of small cross-sectional area and as an example may comprise a relatively long length of thin tubing similar to inductor 16 but having a larger cross-sectional area whereby the inductance is significantly decreased. Capacitor 20 provides a means for storing energy of the fluid medium employed as potential energy and in the case of a compressible fluid such as a gas including air, capacitor 20 is a fixed volume having nonaligned input and output fluid flow passages. In the case of noncompressible fluids such as a liquid, capacitor 20 is in the form of a hydraulic accumulator conventionally comprising a pressure vessel with a movable septum such as a rubber diaphragm separating the liquid from a gas. The electronic equivalent of an accumulator or fixed volume is a capacitor connected to ground. The signal $P_o$ at the output of the filter network is a relatively ripple-free analog (D.C.) signal having a pressure level inversely proportional to the frequency of $\Delta P_i$ and is indicated by the dashed line representation $P_o$ in FIGURE 3a. This filtered single-sided signal $P_o$ is useful in many applications and may be supplied directly to a utilization means which may comprise further fluidic circuitry or a pneumatically or hydraulically actuated movable element such as a valve or the like. However, in some applications a double-sided (differentially pressurized) fluid signal is desired or even required. In the latter instance, the filtered single-sided output signal $P_o$ may be converted to a double-sided signal $\Delta P_o$ by employing an additional analog-type fluid amplifier 21 wherein the filtered single-sided signal $P_o$ is supplied to one of the control fluid inlets and the second control fluid inlet is supplied with a bias signal $P_B$ which may conveniently be provided from the power fluid supply upon passage through a fluidic resistor 22 for dropping the pressure level to a desired bias value. This bias pressure may represent the desired reference value of the control system parameter being monitored and converted from a frequency signal to an anolog signal by means of my circuit. The pressurized fluid signal $\Delta P_o$ developed across the outputs of the two receivers of fluid amplifier 21 is substantially identical in wave form to the single-sided filtered signal $P_o$ as indicated in the wave forms in FIGURE 3a. Attention is directed, however, to the fact that the bias pressure $P_B$ determines the zero pressure point in the output signal $\Delta P_o$ such that at the lower frequencies of input signal $\Delta P_i$, output terminal 23 is pressurized positive relative to terminal 24, whereas at the higher frequencies terminal 24 becomes positive and increases positively with increasing frequency of input $\Delta P_i$ as indicated by the polarity symbols at terminals 23, 24.

The output pressure of ($P_o$ and $\Delta P_o$) versus frequency of (input signal $\Delta P_i$) characteristics of my circuit are very linear as indicated in the graph of FIGURE 3b. In particular, for a circuit comprising the following elements, the linearity is substantially perfect from a frequency of approximately 5 Hertz (Hz.) to approximately 350 Hz. and thus my invention provides a simple fluidic circuit for converting a frequency signal to an analog signal. My circuit is an easily fabricated device which may comprise individually fabricated fluid amplifier and fluidic resistor and reactance devices interconnected by suitable tubing or other means, or may be fabricated in integrated circuitry form wherein the fluid amplifiers, resistors 19 and 22, and even inductor 16 are all formed within a unitary structure having externally connected capacitor 20. In either event, my circuit is adapted for ease of fabrication and is very compact due to its use of very few elements. A typical circuit for obtaining the output pressure versus frequency characteristics illustrated in FIGURE 3b is comprised of the following elements: Digital amplifier 6 has a power fluid supply pressure of 2 lbs. per square inch gauge (p.s.i.g.) and a power nozzle cross section of 0.020 inch width by 0.032 inch height, amplifier 13 has power fluid supply pressure of 5 p.s.i.g. and power nozzle cross section of 0.20 by 0.20 inch, rectifier 17 has power fluid supply pressure of 5 p.s.i.g. and power nozzle cross section of 0.20 by 0.20 inch, inductor 16 has a length of 3 inches and internal diameter of 0.027 inch, resistor 19 has a length of 1.0 inch and internal diameter of 0.018 inch, filter capacitor has a volume of 2.0 cubic inches, fluid amplifier 21 has power fluid supply pressure of 5 p.s.i.g. and power nozzle cross section of 0.020 by 0.020 inch, and bias resistor 22 is a variable resistor (typically a needle valve). The advantage of employing a variable resistor for bias resistor 22 is that it provides a convenient means for varying the reference value of the control system parameter being frequency-to-analog converted by my circuit. Varying the fluid resistance of resistor 22 (i.e., varying bias pressure $P_B$) has the effect of varying the null point of the output $\Delta P_o$. In particular, varying bias pressure $P_B$ provides a family of parallel lines in FIGURE 3b.

Finally, it should be emphasized that the inductance value of frequency-sensitive element 16 is a primary factor in determining the frequency range and sensitivity of my circuit. As illustrated in FIGURE 3c, for small values ($L_1$) of inductance the frequency range is greater but the sensitivity (change in frequency of input signal $\Delta P_i$ for a given change in output pressure $\Delta P_o$) becomes less whereas for large values ($L_2$) of inductance the frequency range is decreased but the sensitivity is increased. Obviously the circuit gain can be increased without affecting the sensitivity by merely adding more stages of analog amplifiers 13 or 21.

It is apparent from the foregoing that my invention attains the objectives set forth. In particular, my invention provides a fluid-operated frequency-to-analog circuit which is constructed from the elements known as fluid amplifiers having no mechanical moving parts. My circuit has a very linear pressure output versus frequency characteristic and is constructed of a relatively small number of elements for ease of fabrication and compactness. When used in a system requiring only a single-sided output signal $P_o$, the essential elements of my circuit are the digital amplifier 6, frequency sensitive element 16, rectifier 17 and filter network 19, 20. Buffer amplifier 13 is generally employed but is not a necessary element in all cases and in future designs of fluid amplifiers where the disparity between the output resistance of one stage and the input resistance of the next succeeding stage are smaller, such buffer amplifier will not be required in any case. Thus, my frequency-indicating circuit has the two advantages not possessed by any one of the prior art circuits in that it provides a very linear output pressure versus frequency characteristic and is very simple in structure.

Having described two embodiments of my fluidic frequency-to-analog circuit, it is believed obvious that modification and variation of my invention is possible in light of the above teachings. Thus, buffer amplifier 13 may be omitted if the output resistance characteristics of digital amplifier 6 and the input resistance characteristics of rectifier 17 can be sufficiently matched. Also, the linear pressure output versus frequency range can be extended by decreasing the value of the inductance element 16. This can best be accomplished by reducing the length of the inductive tube element 16. It is, therefore, to be understood that changes may be made in the particular embodiments of my invention described which are within the full intended scope of the invention.

What I claim as new and desire to secure by Letters Patent of the United States is:

1. A fluidic frequency-to-analog circuit comprising
   first fluidic means for producing alternating, constant amplitude, square wave pressurized fluid pulses in response to pressurized fluid input signals,
   second fluidic means in fluid communication with said first means for converting the square wave pulses into pressurized fluid signals having average amplitudes being a function of the frequency of the input signals, and
   third fluidic means in fluid communication with said first and second means and responsive to the average amplitude signals for producing a pressurized fluid analog output signal having a pressure level inversely proportional to the frequency of the input signals.

2. The fluidic frequency-to-analog circuit set forth in claim 1 wherein
   said first fluidic means comprises a digital-type bistable fluid amplifier.

3. The fluidic frequency-to-analog circuit set forth in claim 1 wherein
   said second fluidic means comprises a passive frequency-sensitive fluid flow element for converting the alternating square wave pulses into alternating pressurized fluid signals having substantially reduced average amplitudes at low frequencies of the input signal and having increasing average amplitudes with increasing frequency of the input signal.

4. The fluidic frequency-to-analog circuit set forth in claim 3 wherein
   said frequency-sensitive element comprises a fluidic inductor consisting of a relatively long enclosed fluid flow passage having a small cross-sectional area and connected across the inputs to said third fluidic means.

5. The fluidic frequency-to-analog circuit set forth in claim 3 wherein
   said frequency-sensitive fluid flow element consists of a pair of fluidic inductors consisting of relatively long enclosed fluid flow passages having small cross-sectional areas and having first ends thereof connected to the inputs to said third fluidic means and having second ends thereof vented to the atmosphere.

6. The fluidic frequency-to-analog circuit set forth in claim 1 wherein
   said third fluidic means comprises a first analog-type fluid amplifier having a power fluid inlet, a pair of control fluid inlets, and a single receiver aligned with said power fluid inlet, said pair of control fluid inlets in fluid communication with said first and second means.

7. The fluidic frequency-to-analog circuit set forth in claim 6 and further comprising
   a fluidic filter network comprising a fluidic resistor and a fluidic capacitor connected to the output of said single receiver of said first analog-type fluid amplifier for filtering out transient variations in the pressure level of the analog output signal at the output of said single receiver.

8. The fluidic frequency-to-analog circuit set forth in claim 7 and further comprising
   a second analog-type fluid amplifier having a first control fluid inlet connected to the output of said filter network and having a second control fluid inlet connected to a source of pressurized fluid for biasing said second fluid amplifier at a particular operating point to thereby obtain a differentially pressurized fluid output signal wherein the differential pressure is inversely proportional to the frequency of the input signals.

9. A frequency-sensitive fluidic circuit comprising
   a digital-type fluid amplifier comprising a power fluid inlet, a pair of opposed control fluid inlets, and a pair of receivers for receiving the fluid from said power fluid inlet,
   a relatively long enclosed fluid flow passage having a small cross-sectional area and connected across the outputs of said pair of receivers for providing a shorting path to the fluid flowing therefrom at low frequencies of pressurized fluid signals supplied to the control fluid inlets of said digital-type amplifier and having a decreasing shorting effect on the fluid flowing from the outputs of said receivers with increasing frequency of the signals, and
   means in fluid communication across said relatively long passage for utilizing the fluid signals modified by said passage.

10. A frequency-sensitive fluidic circuit comprising
    means for providing alternating square wave pressurized fluid pulses across a pair of enclosed fluid flow passages,
    a relatively long length of thin tubing connected across said pair of passages, and
    means connected across said tubing for utilizing pressurized fluid signals developed across said tubing, said tubing providing a shorting circuit across said pair of passages at low frequencies of the square wave pulses to thereby significantly reduce the average amplitude of the pressurized fluid signals supplied to said utilization means and said tubing having a decreasing shorting effect with increasing frequency of the square wave pulses to thereby obtain a frequency-sensitive characteristic wherein the average amplitude of the signals supplied to said utilization means varies directly with the frequency of the square wave pulses.

11. A frequency-sensitive fluidic circuit comprising
    means for providing square wave pressurized fluid pulses across a pair of enclosed fluid flow passages,
    first and second relatively long lengths of thin narrow tubing having first ends thereof connected to alternate ones of said flow passages and second ends vented to the atmosphere, and
    means for utilizing the pressurized fluid signals developed across said tubings, said tubings providing a shorting circuit across said pair of passages at low frequencies of the square wave pulses to thereby significantly reduce the average amplitude of the pressurized fluid signals supplied to said utilization means and said tubings having a decreasing shorting effect with increasing frequency of the square wave pulses to thereby obtain a frequency-sensitive characteristic wherein the average amplitude of the signals supplied to said utilization means varies directly with the frequency of the square wave pulses.

12. A fluidic frequency-to-analog circuit comprising
    a digital-type fluid amplifier adapted to be supplied with alternating pressurized fluid input signals, output of said amplifier providing alternating constant amplitude, square wave pressurized fluid pulses of frequency equal to the frequency of the input signal,
    a first analog-type fluid amplifier comprising a pair of control fluid inlets in fluid communication with the outputs of said digital amplifier and a pair of receivers,
    frequency sensitive fluidic means connected across the pair of receivers of said first analog amplifier for converting the alternating square wave pulses of the output of said digital amplifier into alternating pressurized fluid signals having average amplitudes being directly proportional to the frequency of the input signal, and
    a second analog-type fluid amplifier comprising a pair of control fluid inlets connected across said frequency-sensitive fluidic means and a single receiver for producing at the output thereof a pressurized analog fluid signal having a pressure level inversely proportional to the frequency of the input signal.

13. The fluidic frequency-to-analog circuit set forth in claim 12 and further comprising
fluidic filter network means connected at the output of the receiver of said second analog fluid amplifier for filtering out transient variations in the analog fluid signal at the output of said second analog fluid amplifier.

14. A frequency-sensitive circuit comprising
first and second lengths of thin narrow tubing having first ends thereof connected to alternate receivers of a first analog-type fluid amplifier and second ends vented to the atmosphere, and
second fluid amplifier means having control fluid inlets thereof connected to the first ends of said tubings for utilizing pressurized fluid signals developed across said tubings, said tubings providing an inductive effect wherein the lengths of the open-ended tubing determine the phase change of pressurized fluid signals transmitted from the receivers of the first analog amplifier to an input of said second fluid amplifier means due to a derivative response of the inductive effect as distinguished from the inductive effect in a tuned inductance-capacitance circuit.

References Cited

UNITED STATES PATENTS 3,185,166    5/1965    Horton et al. _____ 137—81.5
3,339,571    9/1967    Hatch _____ 235—201 XR RICHARD B. WILKINSON, Primary Examiner L. R. FRANKLIN, Assistant Examiner U.S. Cl. X.R.

137—81.5